United States Patent
Kobayashi et al.

(10) Patent No.: US 7,809,485 B2
(45) Date of Patent: Oct. 5, 2010

(54) SHIFT CONTROL APPARATUS AND METHOD OF CONTINUOUSLY VARIABLE TRANSMISSION

(75) Inventors: Atsufumi Kobayashi, Kanagawa (JP); Tatsuo Ochiai, Kanagawa (JP); Takuro Kawasumi, Tokyo (JP)

(73) Assignee: JATCO Ltd, Fuji-shi (JP)

( * ) Notice: Subject to any disclaimer, the term of this patent is extended or adjusted under 35 U.S.C. 154(b) by 557 days.

(21) Appl. No.: 11/451,607

(22) Filed: Jun. 13, 2006

(65) Prior Publication Data
US 2007/0087874 A1 Apr. 19, 2007

(30) Foreign Application Priority Data
Jun. 13, 2005 (JP) ............................. 2005-172482

(51) Int. Cl.
*G06F 7/00* (2006.01)
(52) U.S. Cl. .............................. 701/62; 701/51; 701/87; 477/37; 474/28
(58) Field of Classification Search .................. 701/62, 701/51, 87; 477/37; 474/28
See application file for complete search history.

(56) References Cited

U.S. PATENT DOCUMENTS

| | | | | |
|---|---|---|---|---|
| 4,942,784 A | * | 7/1990 | Okahara | 477/94 |
| 5,103,398 A | * | 4/1992 | Akiyama | 701/54 |
| 5,178,044 A | * | 1/1993 | Suzuki et al. | 477/43 |
| 5,216,608 A | * | 6/1993 | Ito et al. | 701/90 |
| 5,225,982 A | * | 7/1993 | Ito et al. | 701/91 |
| 5,362,287 A | * | 11/1994 | Tanaka et al. | 477/175 |
| 5,390,116 A | * | 2/1995 | Hayafune | 701/65 |
| 5,586,953 A | * | 12/1996 | Abo | 477/47 |
| 6,188,946 B1 | | 2/2001 | Suzuki et al. | |
| 6,311,116 B1 | * | 10/2001 | Lee | 701/70 |

FOREIGN PATENT DOCUMENTS

JP 11-094071 A 4/1999

* cited by examiner

*Primary Examiner*—Robert A Siconolfi
*Assistant Examiner*—Stephen Bowes
(74) *Attorney, Agent, or Firm*—Foley & Lardner LLP (57) ABSTRACT

A shift control apparatus of a CVT installed in a non-ABS equipped vehicle is arranged to estimate a condition of a transmission ratio of the CVT, to prohibit a shift operation of varying the transmission ratio to a high-speed-side transmission ratio relative to a first predetermined transmission ratio when the driving-wheel acceleration is greater than or equal to a predetermined acceleration, and to cancel the prohibition of the shift operation when the transmission ratio is in a high speed side relative to a second transmission ratio under a condition that the driving-wheel acceleration becomes greater than or equal to the predetermined acceleration.

11 Claims, 9 Drawing Sheets

SHIFT CONTROL APPARATUS AND METHOD OF CONTINUOUSLY VARIABLE TRANSMISSION

BACKGROUND OF THE INVENTION

The present invention relates to a shift control apparatus of a belt type continuously variable transmission (CVT) installed in a vehicle.

A belt-type CVT is generally constructed by a primary pulley of receiving an engine revolution, a secondary pulley connected to driving wheels, a V-belt wound on these pulleys. A transmission ratio (CVT ratio) of the CVT is continuously varied by varying effective pulley diameters for the V-belt.

Figure 8:
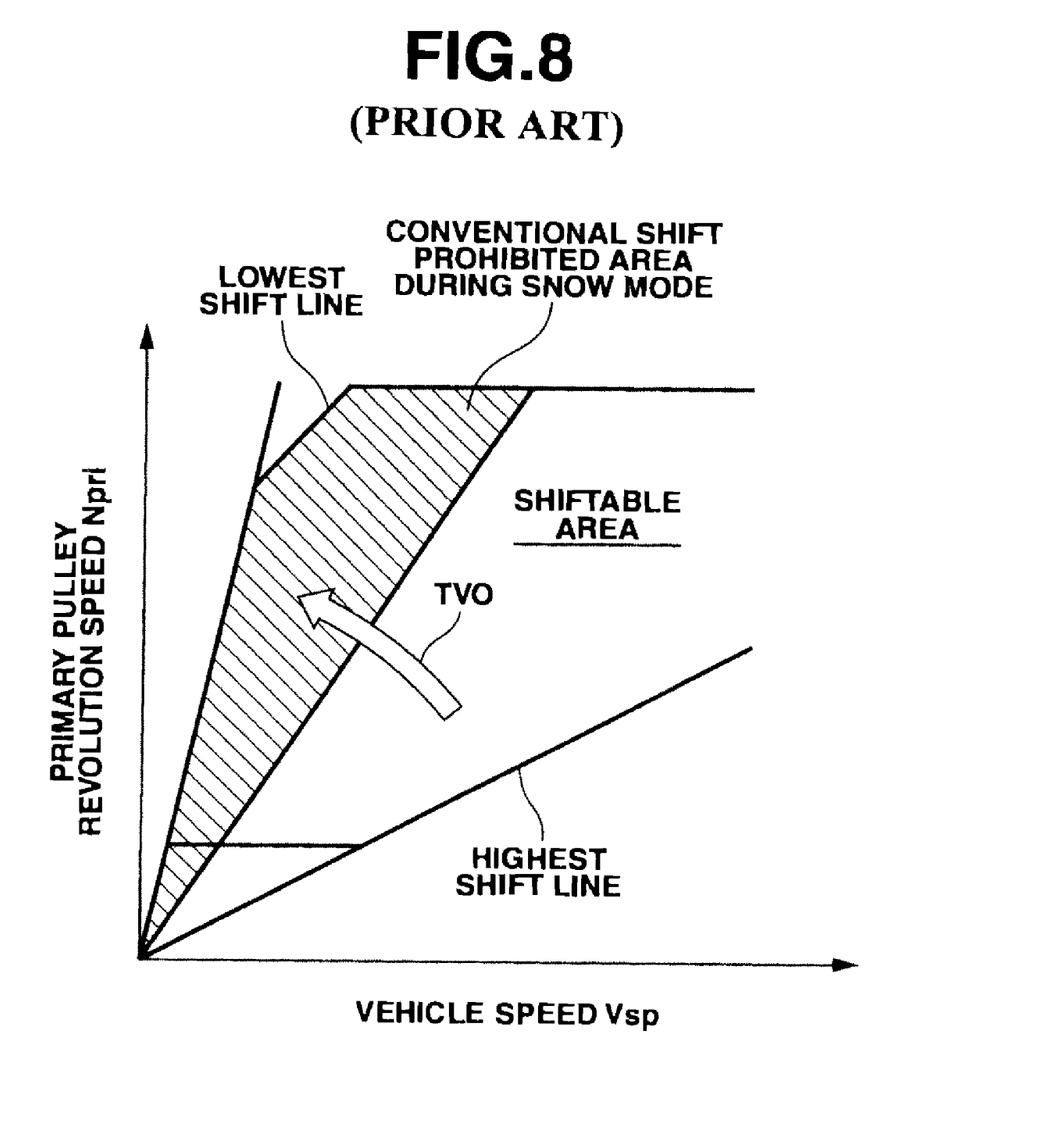
FIG. 8 is a graph showing a shift schedule employed in a related shift control of the CVT.

FIG. 8 shows a generally known shift schedule of a continuously variable transmission (CVT) and shows a relationship between a revolution speed of the primary pulley with respect to a vehicle speed Vsp, which relationship is a target of a throttle opening TVO. Herein, a primary-pulley target revolution speed Nprit corresponding to the combination of the throttle opening TVO and the vehicle speed Vsp takes a value within an area defined by a lowest-speed-side shift line derived from the mechanical limit of the CVT and a highest-speed-side shift line. The CVT is controlled so that the actual revolution speed Npri of the primary pulley is brought closer to the target revolution speed Nprit. As a result, a target transmission ratio ipt is represented and limited by a ratio between a primary-pulley target revolution speed Nprit and a secondary-pulley revolution speed Nsec (ipt=Nprit/Nsec). Therefore, the shift control of the CVT is executed to bring an actual transmission ratio ip closer to the target transmission ratio ipt.

Figure 9A:
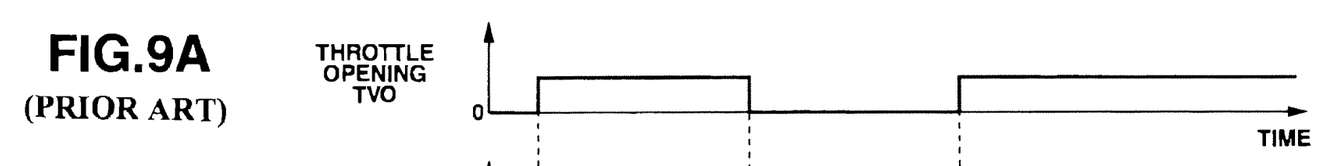
FIGS. 9A, 9B and 9C are time charts showing the operation in case the wheel spin countermeasure is taken by the related shift control.
Figure 9B:
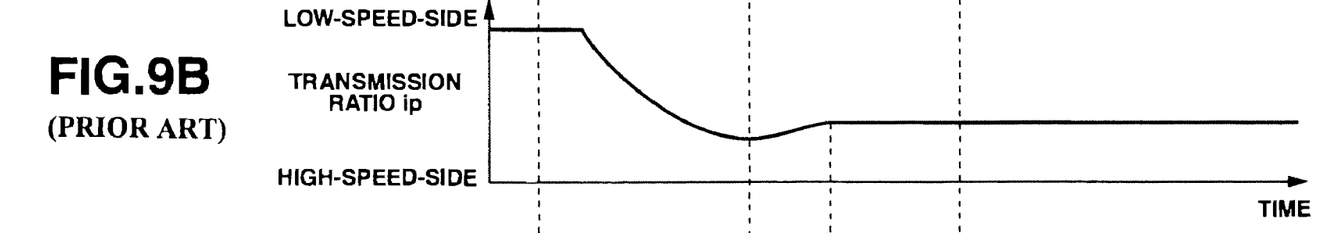
Figure 9C:
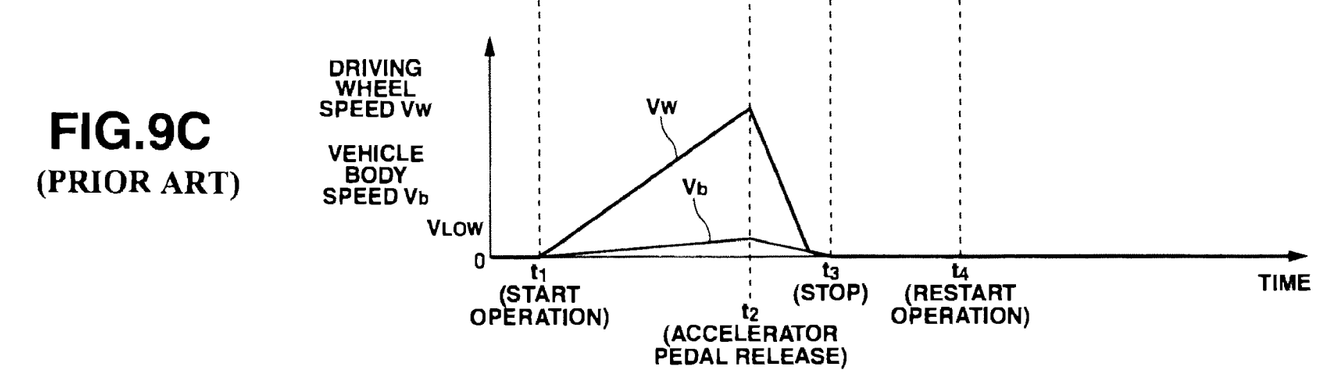

In case that a vehicle starts on a low-friction coefficient ($\mu$) upslope such as a snow-covered upslope, there is a possibility of inducing a wheel spin just after a start operation at moment $t_1$ as shown in FIGS. 9A, 9B and 9C. Under such a wheel spin state, a conventional shift control executes operations that the target transmission ratio ipt is quickly changed to a high-speed side ratio in response to the quick increase of the driving-wheel speed Vw, and the actual transmission ratio ip is upshifted according to the quickly-changed target transmission ratio ipt. On the other hand, when a driver senses the wheel spin at moment $t_2$ in FIGS. 9A, 9B and 9C, the driver stops a depression of an accelerator pedal so that the accelerator pedal is put in a released state so called a pedal release. By this driver's operation, a throttle opening TVO is fully closed. Therefore the driving-wheel speed Vw is quickly decreased and reaches 0 together with a vehicle body speed Vb, and at last the vehicle stops at moment $t_3$.

In such a quick vehicle stopped state, the target transmission ratio ipt is quickly set at a low-speed side ratio according to the quick decrease of the driving-wheel speed Vw, and the transmission ratio ip is downshifted according to the quickly changed target transmission ratio ipt. However, the vehicle speed Vb is not so high, and therefore the vehicle stops within a short time period. Consequently, the vehicle stops before the transmission ratio is sufficiently returned to the low-speed side ratio, and is fixed at the high-speed side ratio at moment $t_3$.

Under such a state that the transmission ratio ip is fixed at the high-speed side ratio, even if a restart operation of depressing the accelerator pedal is executed at moment $t_4$ after the vehicle stop, the vehicle may not be able to restart due to the shortage of the driving force caused by the transmission ratio set at the high-speed side ratio.

Against the wheel spin on a low-$\mu$ road, there is a countermeasure of manually or automatically selecting a snow mode. By selecting the snow mode, a shift operation of setting the target input revolution speed Nprit within a low-speed side area represented by hatching in FIG. 8 is prohibited, that is, a shift operation of setting the target transmission ratio ipt within a low-speed side ratio area is prohibited even when the vehicle just starts. However, the operation executed by selecting the snow mode can not solve the above-discussed problem after the driving wheels have been put in a wheel spin state.

Japanese Published Patent Application No. H11-94071 has proposed a control method of ensuring a vehicle starting capability so as not to occur a shortage of the driving force during a vehicle start, by limiting the transmission ratio from changing to the high-speed side as compared with a set transmission ratio when wheel spin is detected after the vehicle start operation is executed. In this control method, it is determined that wheel spin is generated when the driving-wheel acceleration becomes greater than or equal to the set transmission ratio, and the set transmission ratio is set at a limit transmission ratio by which the vehicle can start on any travelable road such as on a low-friction-coefficient upslope. Further, the set transmission ratio is gradually varied to the highest-speed side transmission ratio so as to gradually cancel the limitation of the transmission ratio.

SUMMARY OF THE INVENTION

Figure 10:
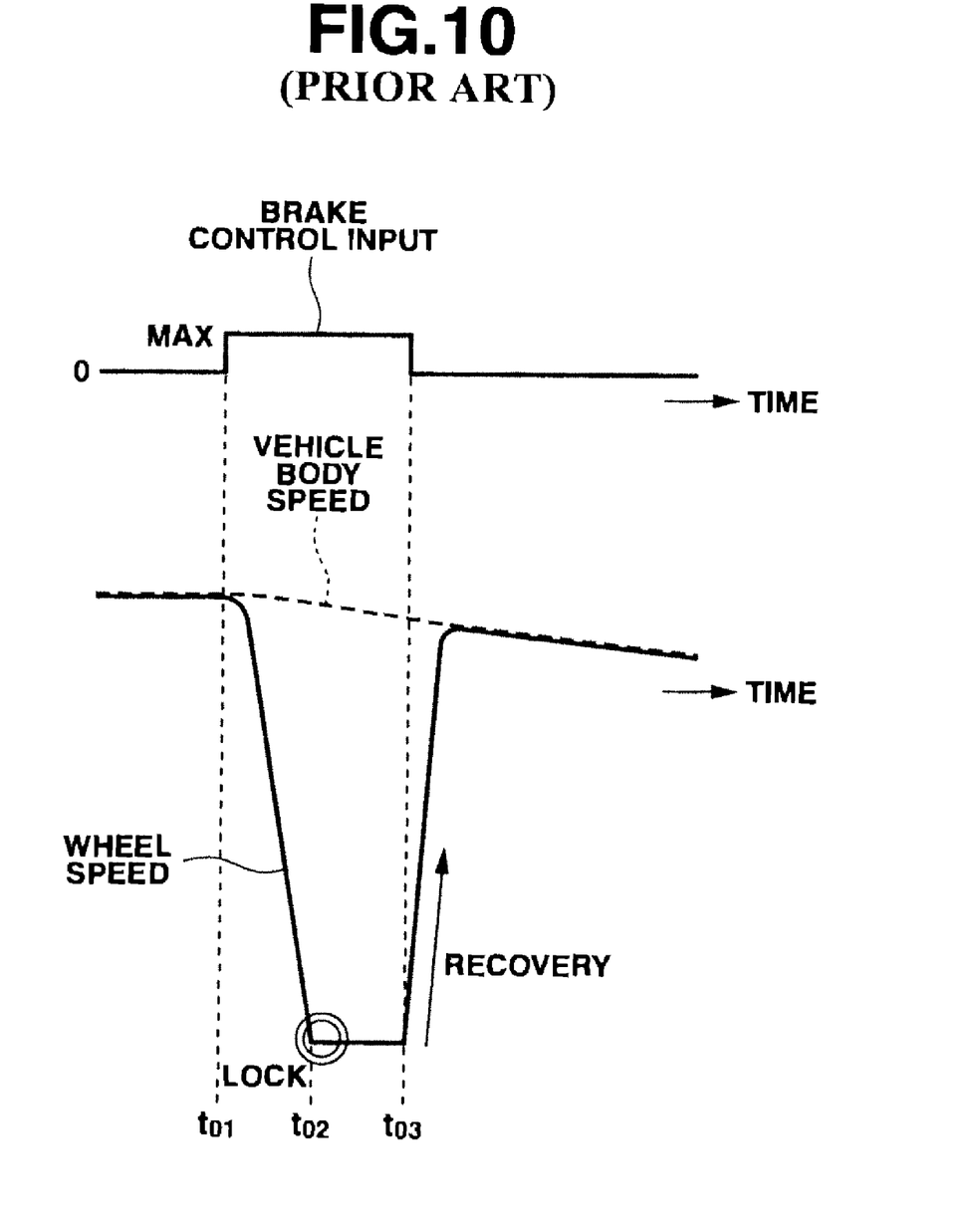
FIG. 10 is time charts showing a problem of the related shift control of FIG. 8.

However, the control method of the Japanese Published Patent Application No. H11-94071 has been proposed as for a vehicle equipped with an antilock brake system (ABS). If this control method is applied to a vehicle equipped with a brake system except for ABS, there is a possibility that such a prohibition control may become operative during a high-speed running. More specifically, in case of a non-ABS equipped vehicle, wheel lock will occur according to a driver's operation or road surface condition. For example, when a rapid braking is executed during a relatively high-speed running on a low-$\mu$ road at moment $t_{01}$ in FIG. 10, wheel lock will be occurred such that a vehicle body speed is almost maintained at a high-speed running state and the driving-wheel speed becomes 0 at moment $t_{02}$ as shown in FIG. 10. In such a wheel lock state, the target transmission ratio ipt is quickly set at the low-speed side ratio according to the quick lowering of the driving-wheel speed, and the transmission ratio ip is varied to a low-speed side ratio. However, if a driver executes a recovery operation of decreasing a depression of a brake pedal in order to cancel the wheel lock at moment $t_{03}$, the wheel speed rapidly increases to the vehicle body speed. Such a transient state is determined as a wheel spin state due to the condition that the driving-wheel acceleration is greater than or equal to the predetermined acceleration. Due to such an unintended state, a prohibition of the shifting to a high-speed side is executed. Accordingly, the transmission ratio to be located near the highest speed side shift line is limited by the set transmission ratio, and an input side revolution speed is raced. This invites an undesired result that a large load is applied to an engine and the CVT and a drivability of the vehicle is degraded.

Herein, in case of an ABS equipped vehicle, wheel lock is basically avoided by the ABS. Further, in case of the ABS-equipped vehicle discussed in the Japanese Published Patent Application No. H11-94071, the above-discussed problem is not occurred since the shift limiting control is put in an inoperative state during the ABS operating state.

It is therefore an object of the present invention to provide a shift control apparatus of a continuously variable transmission and a method thereof which controls a vehicle equipped with non-antilock brake system by executing a shift prohibiting control for prohibiting a shifting to a high-speed side ratio in order to ensure a vehicle start capability even if wheel spin is occurred after a vehicle starting operation is executed, and which is arranged to cancel the shift prohibition control under a condition that the shift prohibition control is not desired.

An aspect of the present invention resides in a shift control apparatus of a continuously variable transmission (CVT) which is installed in a vehicle equipped with a brake system except for an antilock brake system. The shift control apparatus comprises a controller which is arranged to obtain a driving-wheel acceleration, to estimate a transmission ratio of the CVT, to prohibit a shift operation of varying the transmission ratio to a high speed side transmission ratio relative to a first predetermined transmission ratio, when the driving-wheel acceleration is greater than or equal to a predetermined acceleration, and to cancel the prohibition of the shift operation when the transmission ratio is in a high speed side relative to a second predetermined transmission ratio, under a condition that the driving-wheel acceleration is greater than or equal to the predetermined acceleration.

Another aspect of the present invention resides in a method of executing a shift control of a continuously variable transmission (CVT) which is installed in a vehicle equipped with a brake system except for an antilock brake system. The shift control apparatus comprises an operation of obtaining a driving-wheel acceleration, an operation of estimating a transmission ratio of the CVT, an operation of prohibiting a shift operation of varying the transmission ratio to a high speed side transmission ratio relative to a first predetermined transmission ratio, when the driving-wheel acceleration is greater than or equal to a predetermined acceleration, and an operation of canceling the prohibition of the shift operation when the transmission ratio is in a high speed side relative to a second predetermined transmission ratio, under a condition that the driving-wheel acceleration becomes greater than or equal to the predetermined acceleration.

A further another aspect of the present invention resides in a shift control apparatus of a continuously variable transmission (CVT) which is installed in a vehicle equipped with a brake system except for an antilock brake system. The shift control apparatus comprises: driving-wheel acceleration obtaining means for obtaining a driving-wheel acceleration; transmission ratio estimating means for estimating a transmission ratio of the CVT; prohibiting means for prohibiting a shift operation of varying the transmission ratio to a high speed side transmission ratio relative to a first predetermined transmission ratio, when the driving-wheel acceleration is greater than or equal to a predetermined acceleration; and canceling means for canceling the prohibition of the shift operation when the transmission ratio is in a high speed side relative to a second predetermined transmission ratio under a condition that the driving-wheel acceleration is greater than or equal to the predetermined acceleration.

A further another aspect of the present invention resides in a shift control apparatus of a continuously variable transmission (CVT) which is installed in a vehicle equipped with a brake system except for an antilock brake system. The shift control apparatus comprises a controller which is arranged to obtain a driving-wheel acceleration, to estimate a transmission ratio of the CVT, and to prohibit a shift operation of varying the transmission ratio to a high-speed-side transmission-ratio area relative to a first predetermined transmission ratio when the driving-wheel acceleration is greater than or equal to a predetermined acceleration and when the transmission ratio is in a low-speed-side transmission-ratio area relative to a second predetermined transmission ratio.

The other objects and features of this invention will become understood from the following description with reference to the accompanying drawings.

DETAILED DESCRIPTION OF THE INVENTION

Referring to FIGS. 1 through 10, there is discussed a shift control apparatus of a continuously variable transmission (CVT) 2 and a method thereof according to an embodiment of the present invention.

Figure 1:
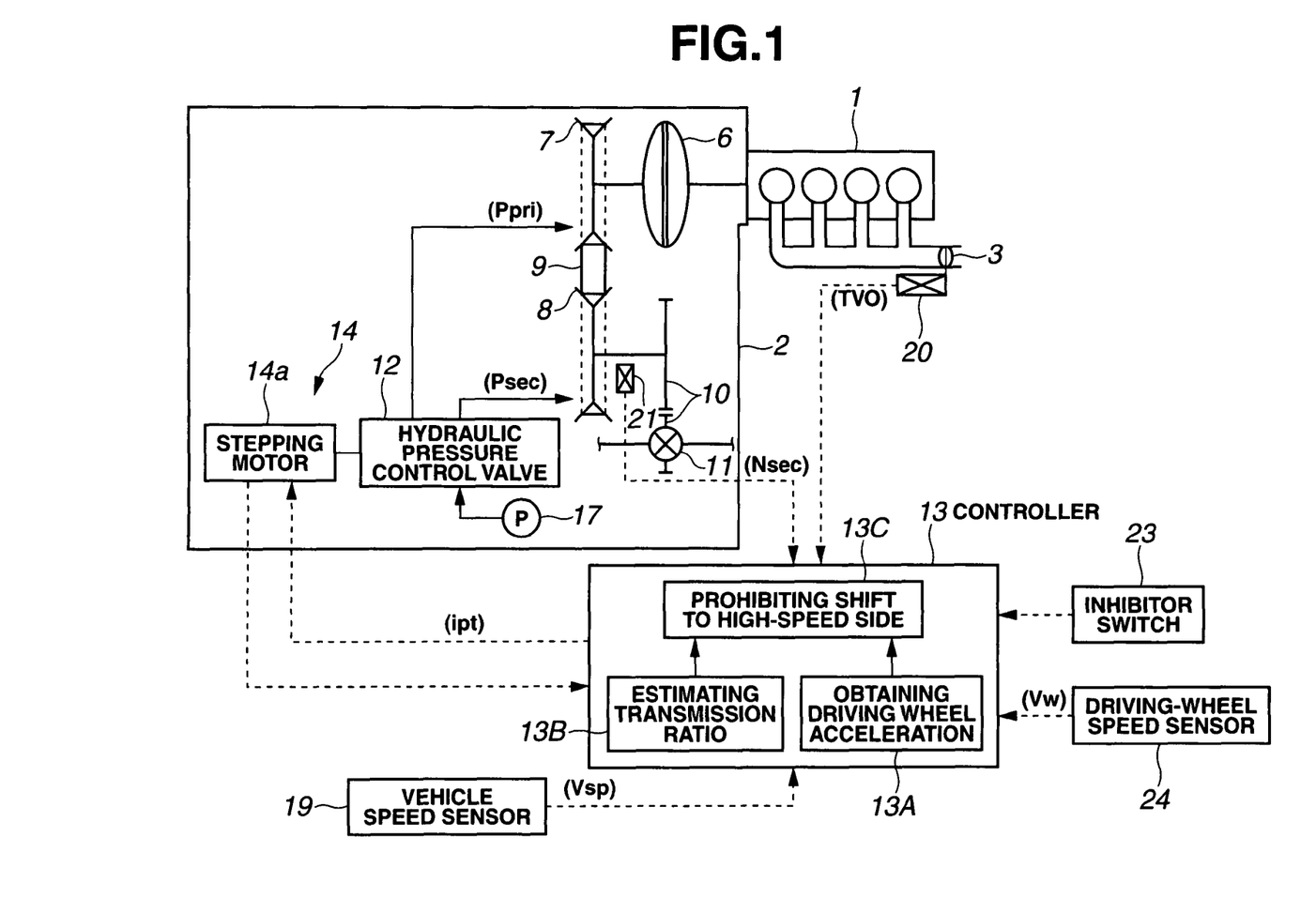
FIG. 1 is a schematic view showing a vehicle power train equipped with a shift control apparatus of a continuously variable transmission (CVT) and an electronic control system thereof in accordance with an embodiment of the present invention.

FIG. 1 is a schematic view showing a vehicle power train equipped with the shift control apparatus of the continuously variable transmission (CVT) 2 according to the embodiment of the present invention, together with an electronic control system. As shown in FIG. 1, the power train comprises an internal combustion engine 1 and the CVT 2. The engine 1 is driven by controlling an intake air quantity and a fuel injection quantity in such a manner to control an opening of a throttle valve 3 on the basis of an acceleration pedal manipulation quantity manipulated by a driver. The vehicle equipped with the CVT 2 is equipped with a brake system except for an antilock brake system (ABS). That is, the shift control apparatus according to the present invention is applied to a non-ABS equipped vehicle.

The CVT 2 employed in the embodiment is a V-belt type CVT and comprises a primary pulley 7 which is drivingly connected to an output shaft of the engine 1 through a torque converter 2, a secondary pulley 8 which is arranged basically on a plane with the primary pulley 7, and a V-belt which is wound around the primary and secondary pulleys 7 and 8. A differential gear device 11 is drivingly connected to the secondary pulley 8 through a final drive gearset 11. By this arrangement, driving wheels (not shown) receive the driving torque generated by the engine 1 and are thus driven.

In order to execute a shift of varying a transmission ratio (CVT ratio) of the CVT 2, the primary pulley 7 and the secondary pulleys 8 are controlled such that movable flanges 7a and 8a thereof move with respect to fixed flanges 7b and 8b thereof, respectively. More specifically, the movable flanges 7a and 8a move toward and away from the respective fixed flanges 7b and 8b to decrease and increase V-shaped grooves of the primary and secondary pulleys 7 and 8.

Figure 2:
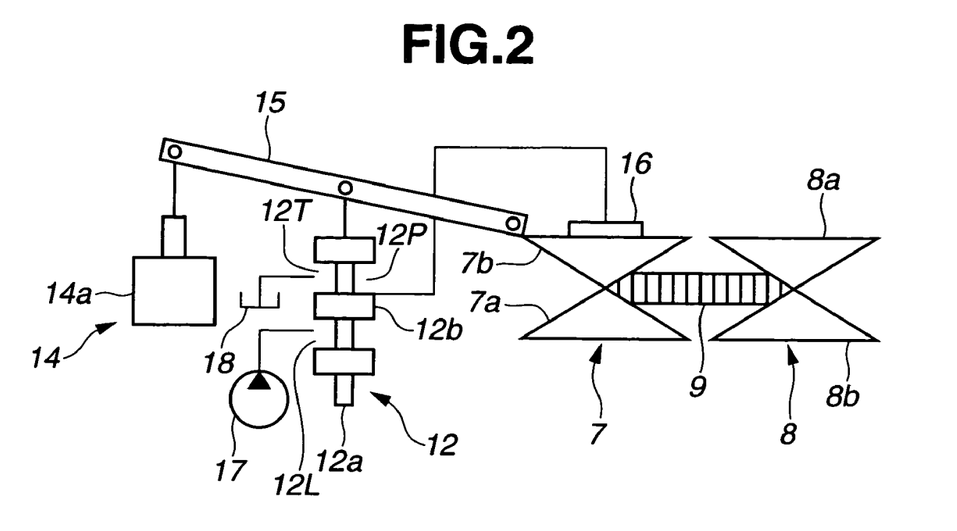
FIG. 2 is a schematic view showing the shift control apparatus according to the embodiment of the present invention.

FIG. 2 is a schematic view showing a mechanism for adjusting the positions of the movable flanges 7a and 8a. As shown in FIG. 2, a cylinder chamber 16 for moving the movable flange 7a of the primary pulley 7 is fluidly communicated with a primary port 12P of a shift control valve 12 driven by a stepping motor 14a through a shift link 15. A base end of the shift link 15 is interlinked with the stepping motor 14a, and the other end of the shift link 15 is pivotally connected to the movable flange 7a of the primary pulley 7. An intermediate portion of the shift link 15 is interlinked with a spool 12a of a shift control valve 12.

The stepping motor 14a moves the shift link 15 according to a target transmission ratio inputted from a controller (CVT control unit) 13 shown in FIG. 1. Since the other end of the shift link 15 moves according to a position of the movable flange 7a, that is, according to an actual transmission ratio, a spool 13a is moved according to a difference between actual transmission ratio ip and target transmission ratio ipt. Consequently, a feedback control is executed as to the shift link 15.

Formed at predetermined positions in the shift control valve 12 are a line pressure port 12L communicated with a line pressure supply circuit including a working fluid pump 17 and a tank port 12T communicated with a working fluid tank 18, in addition to the primary port 12P. By this arrangement, the supply and discharge of working fluid to and from the primary port 12P is controlled according to a position of a land 12b formed in the spool 12a. Therefore, the stepping motor 14a, the shift link 15 and a working fluid supply system including the shift control valve 12 construct an actuator 14 for driving the movable flanges 7a and 8a.

Figure 3:
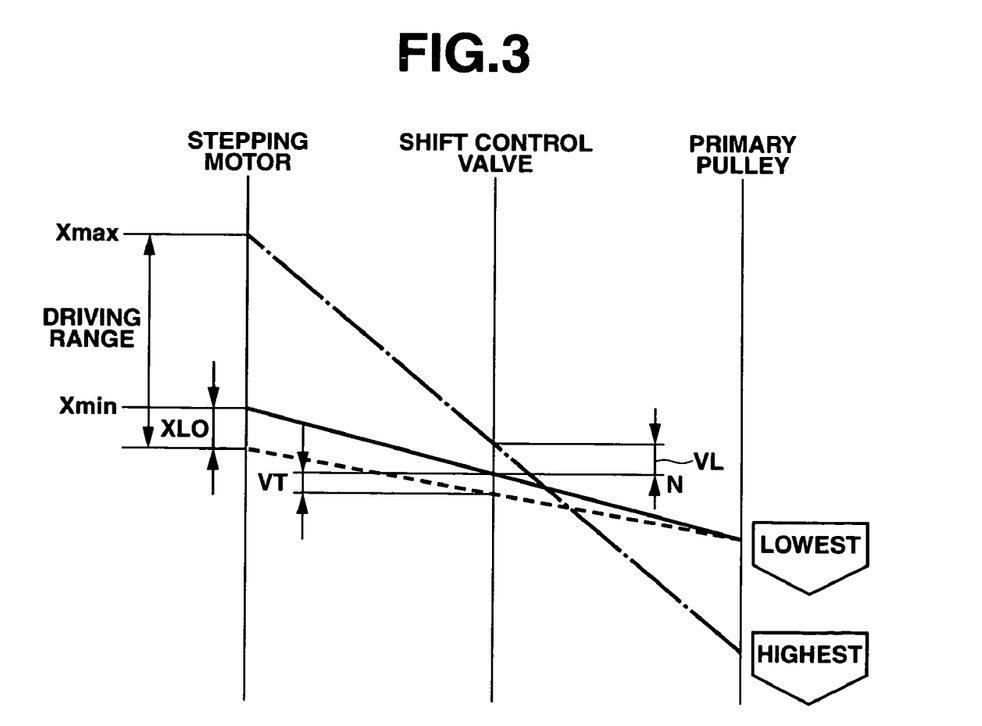
FIG. 3 is a conceptual diagram of a feedback mechanism of the CVT according to the embodiment of the present invention.

Such a shift control of the primary pulley 8 using the shift link 15 continuously varies the transmission ratio from a lowest-speed position to a highest-speed position according to the increase of the driving quantity of the stepping motor 14a as shown in FIG. 3. Accordingly, when the driving quantity of the stepping motor 14a is the maximum driving quantity Xmax, the transmission ratio is set at the highest-speed position. On the other hand, when the driving quantity of the stepping motor 14a ranges between the minimum driving quantity Xmin and an origin point (driving quantity=0), the transmission ratio is set at the lowest-speed position.

The shift control valve 12 is operated between a first predetermined region in that the primary port 12P is communicated with a line pressures port 12L and a second region in that the primary port 12P is communicated with the tank port 12T. The first and second predetermined regions are divided by a neutral position sealed by land 12b. When the driving quantity of the stepping motor 14a becomes greater than the minimum driving quantity Xmin, the primary port 12P is communicated with line pressure port 12L in the first predetermined region, and therefore the transmission ratio is varied. Then, the shift control valve 12 is set at the neutral position when a driving quantity of the stepping motor 14a, which corresponds to the target transmission ratio, accords with a displacement of the movable flange 7a of the primary pulley 7, which corresponds to an actual transmission ratio.

In order to certainly set the transmission ratio at the lowest-speed position when the vehicle temporally stops, an initialization of setting the shift control valve 12 within a range VT wherein the primary port 12P is communicated with the tank port 12T is executed so that the driving quantity of the stepping motor 14a becomes smaller than the minimum driving quantity Xmin. By this initialization, when the vehicle starts running, the transmission ratio certainly starts from the lowest-speed transmission ratio. The driving quantity of the stepping motor 14a during the vehicle stop state is set at an initial position XLO between 0 and Xmin.

By adjusting the shift control valve 12 through the control of the stepping motor 14a, both the movable flanges 7a and 8a are moved at the respective positions according to the primary pulley pressure Ppri and the secondary pulley pressure Psec for bringing the transmission ratio to the target transmission ratio ipt, the stepless shift is achieved such that the actual transmission ratio ip of the CVT 2 is brought to the target transmission ratio ipt.

The controller 13 calculates the target transmission ratio ipt. Therefore, the controller 13 receives a signal outputted from a throttle opening sensor 20 for detecting a throttle opening TVO of the engine 1, a signal outputted from a secondary-pulley revolution speed sensor 21 for detecting a secondary-pulley revolution speed Nsec corresponding to a transmission output revolution speed, a signal outputted from an inhibitor switch 23 for detecting a present selected range of the CVT 2, a signal outputted from a vehicle speed sensor 19 for detecting a vehicle speed VSP, and a signal outputted from a driving-wheel speed sensor 24 for detecting a driving wheel speed Vw indicative of a peripheral speed of the driving wheel.

The controller 13 executes a shift control of the CVT 2 on the basis of the input information. The controller 13 sets the target transmission ratio ipt within an area between a lowest-speed-side shift line and a highest-speed-side shift line shown in FIG. 4, on the basis of a target transmission ratio setting map (not shown) set according to the throttle opening (accelerator opening) and executes the shift control according to the target transmission ratio ipt. However, under a special condition, the controller of the present invention prohibits the control of the transmission ratio ip to a high-speed side ratio, which is smaller than a predetermined transmission ratio (first transmission ratio) ip1. This prohibition of shifting to the high-speed side is also called a high-speed-side shift prohibition control.

A basic method of executing this high-speed-side shift prohibition control in this control is basically similar to the control shown in Japanese Published Patent Application H11-94071. However, the executing conditions of this prohibition control according to the present invention is different from those of the control shown in Japanese Published Patent Application H11-94071.

More specifically, the controller 13 comprises a driving-wheel acceleration obtaining section 13A for calculating a driving-wheel acceleration α under a vehicle running state from information detected by the driving wheel speed sensor 24, a transmission ratio estimating section 13B for estimating a condition of the actual transmission ratio ip of the CVT 2 as an estimated transmission ratio ipe when the vehicle causes a wheel lock, and a high-speed-side shift prohibiting section 13C for prohibiting a shift operation of shifting the transmission ratio to a high-speed-side transmission ratio smaller than the first transmission ratio ip1, on the basis of the states of the driving-wheel acceleration α detected obtained by the driving-wheel acceleration obtaining section 13A and the estimated transmission ratio ipe estimated by transmission ratio estimating section 13B.

The prohibiting section 13C basically executes a high-speed-side shift prohibiting control when it is determined that the driving-wheel acceleration α is greater than or equal to a predetermined acceleration αspin. Further, in case that the estimated transmission ratio ipe estimated at transmission ratio estimating section 13B is smaller than the second predetermined transmission ratio ip2 during the determination, that is, the estimated transmission ratio ipe is set at a low-speed-side ratio with respect to the second present transmission ratio ip2 during the determination, the high-speed-side shift prohibition control is cancelled.

In other words, the condition of executing the high-speed-side shift prohibition control is a condition that the driving-wheel acceleration α is greater than or equal to the predetermined acceleration αspin and the estimated transmission ratio ipe is in a low-speed-side ratio with respect to the second transmission ratio ip2.

The driving-wheel acceleration obtaining section 13A calculates the driving-wheel acceleration α by obtaining a time differential of the driving wheel speed Vw detected by the driving wheel sensor 24. The predetermined acceleration αspin is a value slightly greater than the realizable maximum acceleration of the vehicle under a condition that the driving wheels grip a road surface. In other words, the predetermined acceleration αspin is set at a lower limit of the unrealizable large acceleration of the vehicle and is set as a spin determination acceleration value for determining whether or not the driving wheels generate wheel spin. Accordingly, in case that the driving-wheel acceleration α is greater than or equal to the predetermined acceleration αspin, it is understood that there is a possibility that wheel spin is occurred.

The transmission ratio estimating section 13B estimates transmission ratio ipe on the basis of the stepping-motor position of the stepping motor 14a. When it is determined that the driving-wheel acceleration α is greater than or equal to the predetermined acceleration αspin, that is, when there is a possibility that the driving wheel is put in a wheel-spin state, the estimated transmission ratio ipe is estimated. The purpose of estimating the estimated transmission ratio ipe is to distinguish whether the wheel spin estimated at this moment is a restricted object during a vehicle start (that is, a low speed running), or an excepted object which is caused by rapidly increasing the wheel speed due to a brake pedal release after a wheel lock is generated by a braking operation under a high-speed running on a low μ road.

Figure 5A:
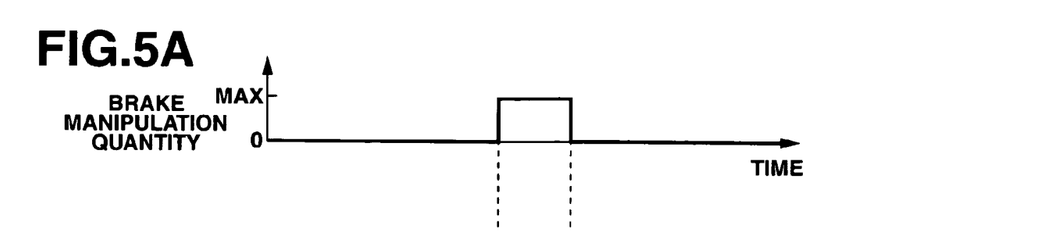
FIGS. 5A, 5B and 5C are time charts showing operations executed by the shift control during wheel spin occurred after a wheel lock during the high-speed running.
Figure 5B:
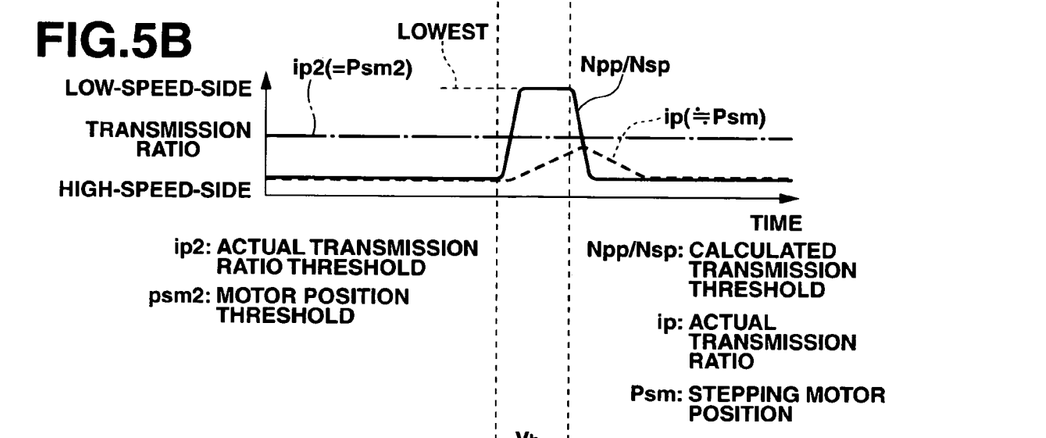
Figure 5C:
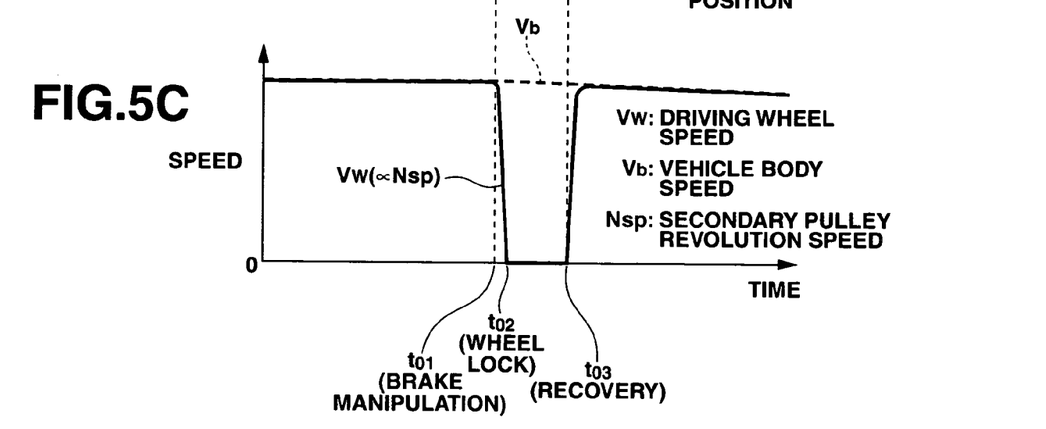

In case that wheel spin is generated by the brake pedal release after the wheel lock during the high-speed running on a low μ road, a brake control input, a transmission ratio (calculated transmission ratio ipc) obtained by the calculation, the actual transmission ratio ip, the stepping motor position Psm, the driving-wheel speed Vw, the vehicle body speed Vb and the secondary pulley revolution speed Nsp vary as shown in FIGS. 5A through 5C. If the wheel lock at moment $t_{o2}$ is generated by the braking operation at moment $t_{o1}$, the secondary revolution speed Nsp becomes 0 at the moment of the wheel lock. Therefore, the transmission ratio obtained as a ratio between the primary pulley revolution speed Npp and the secondary pulley revolution speed Nsp (calculated transmission ratio ipc=Npp/Nsp) is promptly set at the lowest-speed side ratio. At this moment, the target transmission ratio ipt is also promptly set at the lowest-speed side ratio. Thereafter, by the recovery operation at moment $t_{o3}$ from the braking operation, the driving wheel speed Vw is rapidly recovered from 0. During this process the driving-wheel acceleration α becomes greater than or equal to the predetermined acceleration αspin, and simultaneously the secondary pulley revolution speed Nsp rapidly increases. However, since the actual transmission ratio ip has a response delay, the transmission ratio does not rapidly reach the lowest-speed ratio. Therefore, even when it is determined that the wheel speed is generated by the brake pedal release after the wheel lock, the transmission ratio is set at the high-speed side rather than the low-speed side.

Under this condition, it is difficult to determine whether or not the wheel spin condition is generated by the brake pedal release after the wheel lock, that is, whether or not the wheel speed condition is the excepted object, from the calculated transmission ratio ipc=Npp/Nsp. However, since the stepping motor 14a has a response delay which is equal to or greater than the response delay of the actual transmission ratio, during a period from a moment just after the wheel lock to a moment after the brake pedal release, the stepping motor position Psm varies while generally maintaining a condition corresponding to the high-speed-side transmission ratio according to the high-speed running before the wheel lock (particularly in almost constant-speed high-speed running) as shown by a broken line indicative of the actual transmission ratio ip in FIG. 5B. Accordingly, by setting the second transmission ratio ip2 corresponding to a threshold value of the actual transmission ratio ip and a stepping-motor position threshold Psm2 of the stepping motor 14a corresponding to the second transmission ratio ip2 at suitable values, respectively, it becomes possible to estimate whether or not the generated wheel spin is generated by the wheel lock during the low-μ road high-speed running, from the stepping motor position Psm.

Figure 4:
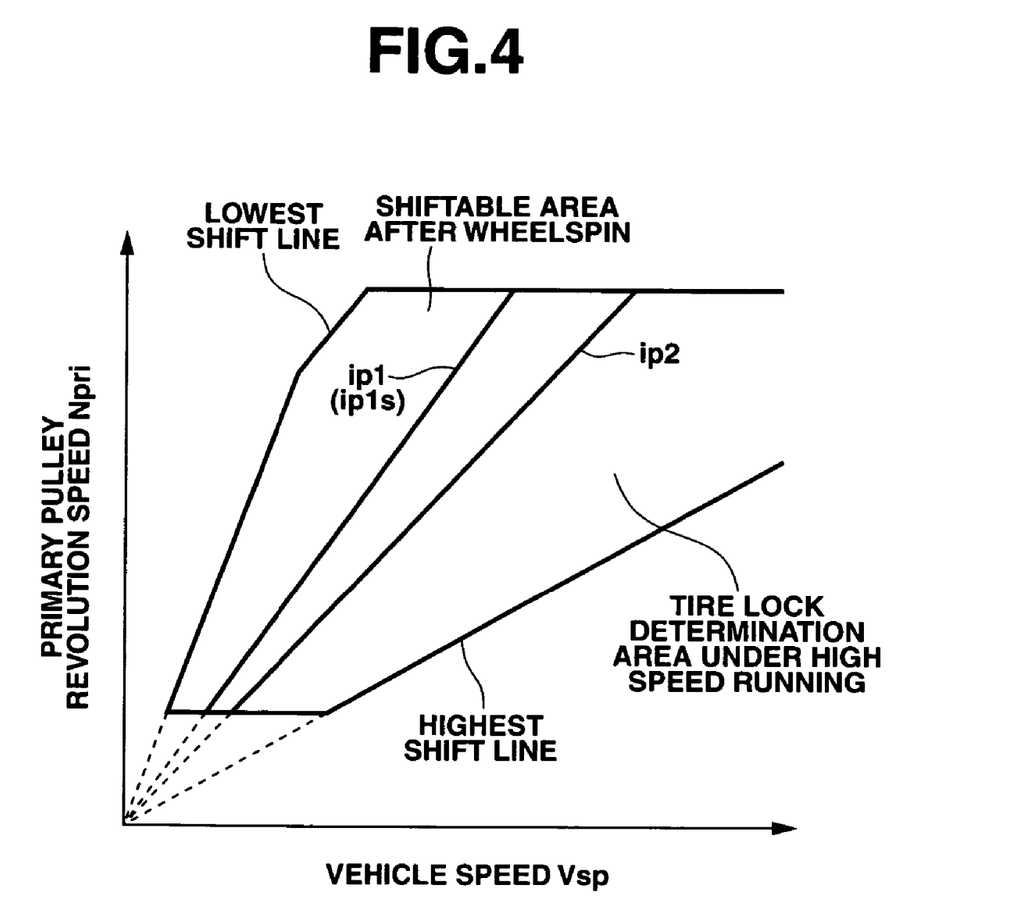
FIG. 4 is a graph showing a shift schedule employed in the shift control of the CVT according to the embodiment of the present invention.

Herein, the second transmission ratio ip2 is set at 1, and the motor position threshold Psm2 is set at a position corresponding to a position determined when ip2=1. By these setting, when the stepping-motor position Psm of the stepping motor 14a is positioned within an area (a high-speed running tire-lock determination area shown in FIG. 4) higher than the stepping-motor position threshold Psm2, it is determined that the generated wheel spin is the excepted wheel spin which is generated after the wheel lock during the low-μ road high speed running. Further, as shown in FIG. 4, the second transmission ratio ip2 is set at a high-speed side as compared with the first transmission ratio ip1, that is, at a side where the transmission ratio is small.

Figure 6:
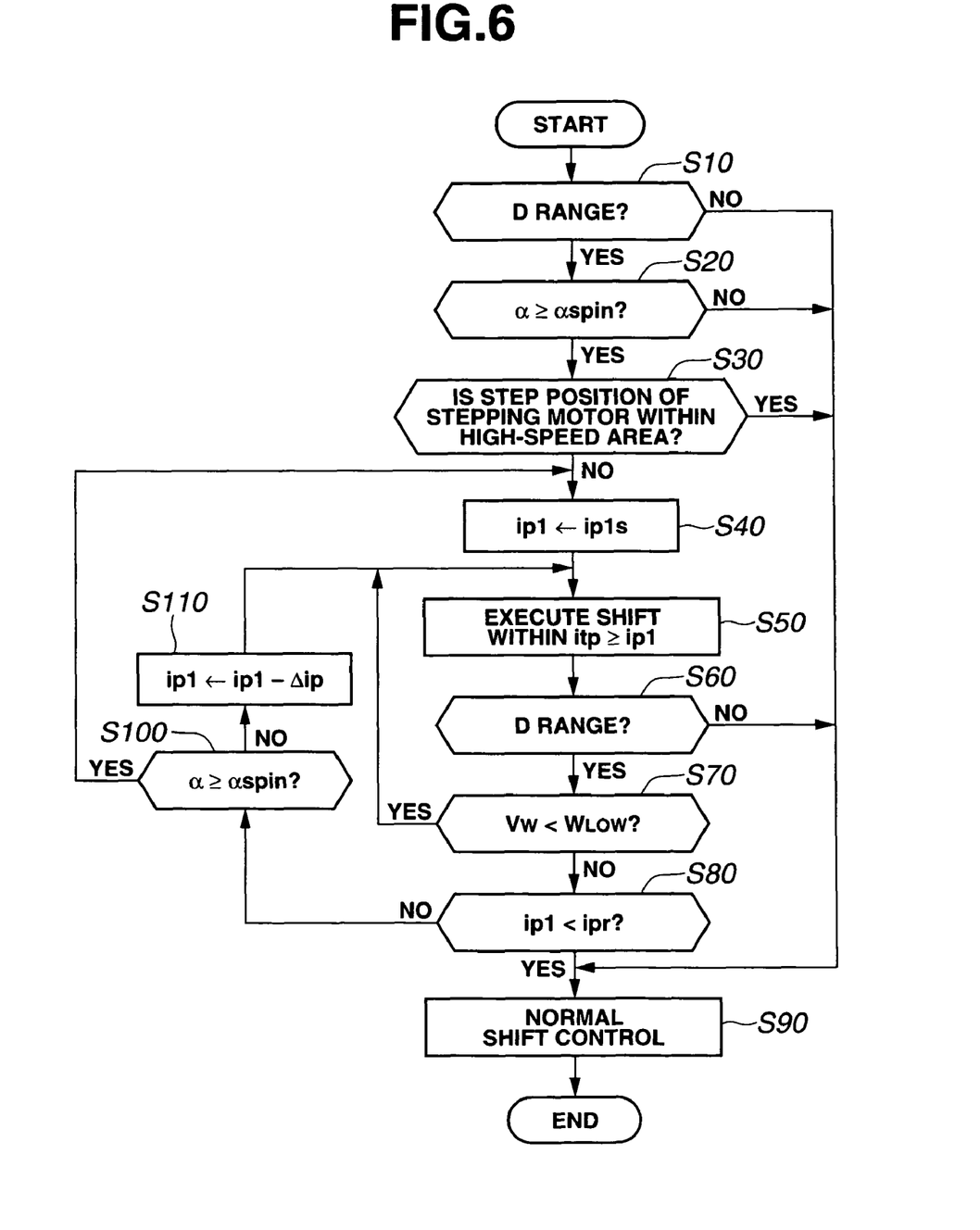
FIG. 6 is a flowchart showing a processing procedure of the shift control executed by the shift control apparatus according to the embodiment of the present invention.

The shift control apparatus of the CVT 2 according to the embodiment of the present invention is arranged as discussed above, and therefore the shift control of the CVT 2 is executed as shown by a flowchart in FIG. 6.

At step S10 it is determined whether or not a selected range of the CVT 2 is a forward running range (herein, D range which is a representative forward running range). When the selected range is not the D range, it is not necessary to execute the shift control according to the present invention, the routine jumps to step S90 wherein a normal shift control for the ranges except for D range is executed, and the target transmission ratio ipt for the actuator 14 shown in FIG. 1 is determined.

When the determination at step S10 is affirmative, that is, when the selected range is D range, the routine proceeds to step S20 wherein it is determined whether or not the driving-wheel acceleration α obtained from the driving wheel speed Vw is greater than or equal to the predetermined acceleration αspin. When it is determined at step S20 that the driving-wheel acceleration α is smaller than the predetermined acceleration αspin (α<αspin), that is, when the driving wheels do not generate wheel spin, it is not necessary to execute the shift control according to the present invention, the routine jumps to step S90 wherein a normal shift control for D range is executed. More specifically, in the normal shift control for D range, a target value (target revolution speed) Nprit which is to be a final target value of the primary pulley revolution speed Npri during the present operating condition, is obtained by retrieving the area surrounded by the lowest-speed-side shift line and the highest-speed-side shift line of a predetermined shift map (not shown).

Subsequently, the target transmission ratio ipt for realizing the target revolution speed Nprit is calculated by dividing the target revolution speed Nprit by the secondary pulley revolution speed Nsec corresponding to the transmission output revolution speed. Further, the actuator 14 is controlled so that the actual transmission ratio ip is brought closer to the target transmission ratio ipt.

On the other hand, when it is determined at step S20 that the driving-wheel acceleration α is greater than or equal to the predetermined acceleration αspin (α≧αspin), there is a possibility that the driving wheel generates wheel spin. Therefore, the routine proceeds to step S30 wherein it is determined whether or not the stepping-motor position Psm is positioned at the high-speed-side area as compared with the motor position threshold Psm2. When the determination at step S30 is affirmative, it is determined that the generated wheel spin is the wheel spin generated after the wheel lock during the low-μ road high-speed running, and that the generated wheel speed is the excepted object. Therefore, the routine jumps to step S90 wherein the above-discussed normal shift control for D range is executed.

At step S30 it is determined using a response delay of the stepping motor 14a as to whether or not the transmission ratio at a moment just before the wheel lock before the wheel speed is generated is positioned at the high side. Therefore, it becomes possible to certainly determine the wheel spin of the target object even when the operating condition is put in a hard determination condition, and it becomes possible to cancel the prohibition control for prohibiting the change of the transmission ratio toward the high-speed side, with respect to the wheel spin generated after the wheel lock during the low-μ road high-speed running.

On the other hand, when the determination at step S30 is negative, that is, when the stepping-motor position Psm is not in the high-speed side area, the generated wheel spin is the object to be restricted. Therefore, in such a case, the shift control aimed in the present invention is executed as follows.

At step S40, as a set transmission ratio for limiting an upshift executed to prevent the vehicle from being put in a start disabled state during the wheel spin generating state, the transmission ratio ip1s shown in FIG. 4 is set as an initial value of the first transmission ratio ip1. Subsequently, at step S50 a shifting for changing the target transmission ratio ipt within a range greater than the first transmission ratio ip1 to a low-speed-side transmission ratio, is only allowed. In other words, a shifting to a high-speed side transmission ratio, in which the target transmission ratio ipt becomes smaller than the first transmission ratio ip1, is prohibited.

Accordingly, immediately after the first transmission ratio ip1 is set at the initial value ip1s shown in FIG. 4 at step S40, the range of the highest-speed-side shift line located above the first transmission ratio ip1 in FIG. 4 is employed as a shift prohibition area for preventing the restart disabled state during the wheel spin generated state. During this period, an area (after-wheel-spin shiftable area) located at a low-speed-side as compared with a line of the first transmission ratio ip1 in FIG. 4 is employed as a shiftable area. It is preferable that the first transmission ratio initial value ip1s is set at a limit transmission ratio which can obtain a driving force necessary for starting the vehicle on a road set at a conceivable condition in friction coefficient and gradient. Therefore, it is preferable that such an initial value is set according to the specifications of an applied vehicle. The first transmission ratio ip1 is a variable value, and therefore when the control is continued, the first transmission ratio ip1 is gradually lowered to the high-speed side ratio.

Subsequently, at step S60 it is again checked whether or not the selected range of the CVT 2 is D range. When the selected range is not the D range, the routine jumps to step S90 wherein a normal shift control for a range except for D range is executed. When the selected range is maintained at D range, the routine proceeds to step S70 wherein it is determined whether or not the vehicle is stopped, by checking whether or not the wheel driving speed Vw becomes smaller than or equal to a stop determination speed Vlow.

When the determination at step S70 is negative, that is, when it is determined at step S70 that the vehicle is not stopped, the routine proceeds to step S80 wherein it is determined whether or not the first transmission ratio ip1 is smaller than or equal to a recovery determination transmission ratio ipr. Herein, the highest transmission ratio corresponding to the highest shift line. When the negative determination is made at step S80, the routine proceeds to step S100 wherein it is determined whether or not the driving-wheel acceleration α is greater than or equal to the spin determination acceleration αspin, in order to determine whether or not the driving wheels are generating wheel spin. When the determination at step S100 is affirmative, that is, when it is determined that the driving wheels are generating wheel spin, the routine returns to step S40 wherein the first transmission ratio ip1 is set at the initial value ip1s. When the determination at step S100 is negative, that is, when it is determined that the driving wheels are not generating wheel spin, the routine proceeds to step S110 wherein the first transmission ratio ip1 is decreased by an amount Δip (ip1→ip1−Δip) to gradually approach the first transmission ratio ip1 to highest-speed side shift line. Thereafter, the routine jumps to step S50 wherein the corrected first transmission ration ip1 is used for defining the shiftable area. That is to say, until the determination at step S80 turns from the negative determination to the affirmative determination, that is, until the first transmission ratio ip1 returns to the highest-speed-side shift line, the first transmission ratio ip1 is returned to the highest-speed-side shift line with a predetermined gradient with respect to time while keeping a condition that the driving wheels are not generating wheel spin. The corrected first transmission ratio is used to define the shiftable range at step S50.

Accordingly, the first transmission ratio ip1 is decreased from the initial value ip1s indicative line shown in FIG. 4 to the highest-speed-side shift line with a predetermined gradient per time. The shift prohibition area between the first transmission ratio shift line and the highest-speed-side shift line is therefore gradually decreased. This arrangement prevents the limiting of the upshift from being continued indefinitely. Further, since this recovery is executed with a predetermined gradient per unit time, this arrangement prevents a driver from having a strange feeling such as a radical change of the transmission ratio.

When the determination at step S80 becomes affirmative, that is, when it is determined at step S80 that the first transmission ratio ip1 is not still returned to the highest-speed-side shift line, the routine proceeds to step S90 wherein the shift control is returned to the normal shift control.

Herein, as long as it is determined at step S70 that the vehicle is stopped, the routine directly returns to step S50 while skipping step S110. Therefore, the recovery of the first transmission ratio is stopped, and the first transmission ratio ip1 is maintained at a value taken at a moment when it is determined that the vehicle is just stopped.

As long as it is determined at step S80 that the first transmission ratio ip1 does not recover to the highest-speed side shift line, when it is determined at step S100 that the driving-wheel acceleration α is greater than or equal to the spin determination acceleration αspin, that is, when it is determined that the driving wheels newly generate wheel spin, the routine returns to step S40 wherein the first transmission ratio ip1 is reset to the initial value shown in FIG. 4.

With the thus arranged apparatus and method according to the present invention, when the vehicle is stopped after wheel spin is generated, the transmission ratio is maintained at the low-speed-side ratio so that it becomes possible to ensure a necessary driving force when the vehicle starts.

Subsequently, there is discussed an operation of the method according to the present invention with reference to time charts shown in FIGS. 7A, 7B and 7C which are comparable with related-art time charts shown in FIGS. 9A, 9B and 9C.

After the vehicle starts at moment $t_1$, when the driving-wheel acceleration α becomes greater than or equal to the spin determination acceleration αspin, that is, when the determination at step S20 becomes affirmative, the first transmission ratio ipt is set at the initial value ip1s in FIG. 4 by the execution of step S40. Then, the first transmission ratio ip1 is maintained at the initial value until a start determining moment $t_{s1}$ at which it is determined at step S70 that the driving-wheel speed Vw becomes greater than the stop determination speed $W_{LOW}$. Thereafter, the first transmission ratio ip1 is decreased with a predetermined time-change gradient Δip by the execution of step S110 until a stop determination moment $t_{s2}$ at which it is determined at step S70 that the driving-wheel speed Vw becomes smaller than or equal to the stop determination speed $W_{LOW}$. Further, the first transmission ratio ip1 is maintained at the value taken at the vehicle-stop determination moment $t_{s2}$ until a restart determination moment $t_{s3}$ at which it is determined at step S70 that the driving-wheel speed Vw again becomes greater than the stop determination speed $W_{LOW}$. After the restart determination moment $t_{s3}$, the first transmission ratio ip1 is decreased with a predetermined time-change gradient Δip by the execution of step S110, and finally recovered to the highest shift line.

Figure 7A:
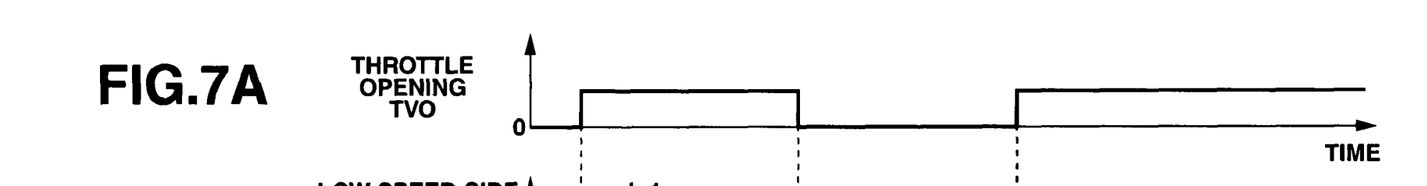
FIGS. 7A, 7B and 7C are time charts showing the operation in case that the wheel spin countermeasure is taken by the shift control according to the embodiment of the present invention.
Figure 7B:
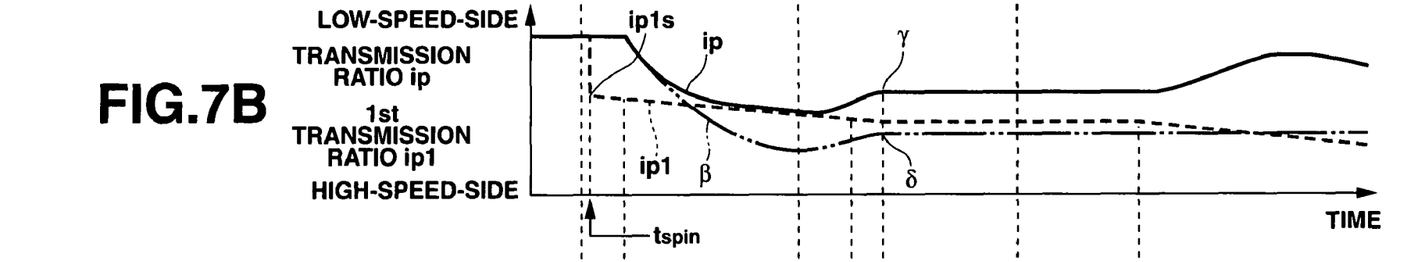

When the driving wheels generates a wheel spin by which the vehicle body speed Vb is almost not increased although the driving wheel speed Vw is rapidly increased immediately after the start operation moment t1, the conventional control rapidly executes an upshift so that the transmission ratio ip is varied to the high-speed side as shown by a two-dot and dash line in FIG. 7B in response to the rapid increase of the driving-wheel speed Vb. Under this condition of the conventional shift control, the driver executes a pedal release for releasing a driver's foot from an accelerator pedal in response to the sensed wheel spin as shown at moment $t_2$. Since the throttle opening TVO is fully closed by this pedal release, the driving-wheel speed Vw is rapidly decreased and becomes 0 simultaneously with the vehicle body speed Vb. As a result, the vehicle stops at moment $t_3$. At this moment, the vehicle body speed Vb is not so increased and therefore the vehicle stops before the transmission ratio ip is sufficiently returned to the low side. Therefore, even if a restart manipulation is executed by depressing the accelerator pedal at a moment t4 after the vehicle stop, the vehicle cannot easily restart due to the driving force shortage caused by the final positioning of the transmission ratio at the high side.

In contrast, according to the present invention, by the execution of step S50, the shifting to the low-speed-side transmission ratio for changing the transmission ratio ip within a range wherein the target transmission ratio ipt is greater than or equal to the first transmission ratio ip1, is only allowed, and the shifting to the high-speed-side transmission ratio for changing the transmission ratio to a range wherein the target transmission ratio ipt becomes smaller than the first transmission ratio ip1, is prohibited. Therefore, the actual transmission ratio ip is limited in upshift so as not to become smaller than the first transmission ratio ip1 as shown by a solid line in FIG. 7B. Therefore, even if the transmission ratio ip is fixed at a transmission ratio γ at moment t3 at which the vehicle stops just after a driver's foot is released from the accelerator pedal, the fixed transmission ratio γ is a row-speed-side transmission ratio as compared with the corresponding ratio in case of the conventional shift control and is a ratio at which the vehicle can start. When the restart operation after the vehicle stop is executed, the vehicle starts from the transmission ratio γ. Accordingly, the vehicle can restart while ensuring a start driving force and the restart disabled state due to the shortage of the driving force is prevented. As shown in FIG. 7C, the vehicle body speed Vb, therefore, smoothly increases after a restart operation moment $t_4$.

In the embodiment according to the present invention, since the spin determination acceleration αspin is set at a lower limit of an unrealizable large acceleration of each vehicle, it becomes possible to accurately execute the prediction of generating wheel spin based on the expression $\alpha \geq \alpha_{spin}$ by the execution of step S20. This enables the limitation of the above-discussed upshift to be executed only when the restart disabled state preventing function is actually required. Therefore, it becomes possible to solve problems such as the degradation of fuel consumption and the generation of noises due to the use of a high engine speed range for restart.

Further, in this embodiment, the initial value ip1s of the first transmission ratio ip1, which is the upshift limiting transmission ratio, is set as a limit transmission ratio by which a driving force capable of restarting on a possible low-μ and/or a up-slope road, and therefore the vehicle can certainly restart. This upshift limitation is executed only when the restart disabled state preventing function is actually required. Therefore, it becomes possible to solve problems such as the degradation of fuel consumption and the generation of noises due to the use of a high engine speed range for restart.

During a period from moment ts1 to moment $t_{s2}$ and a period after moment $t_{s3}$ in FIG. 7B, the first transmission ratio ip1 is gradually decreased to the high-speed-side ratio by a predetermined time-change gradient Δip, and therefore the limitation of the upshift is gradually eased. Therefore, it becomes to avoid the problem of continuing the limitation of the upshift. Since the cancellation of the upshift limitation is gradually executed, it is possible to avoid a driver from having a strange feeling as to the change of the transmission ratio.

Further, during the stop determination where the vehicle body speed Vb is lower than the stop determining speed $V_{LOW}$ by the execution of step S70, the recovery of lowering the first transmission ratio ip1 is prohibited during a period between moment $t_{s2}$ and moment $t_{s3}$ in FIG. 7B, and the first transmission ratio ip1 is maintained at a value taken at moment $t_{s2}$. Therefore, even when the upshift limitation is gradually canceled, the transmission ratio ip is not returned to a restart disabled transmission ratio. This certainly prevents the vehicle from being put in a restart disabled state.

Figure 7C:
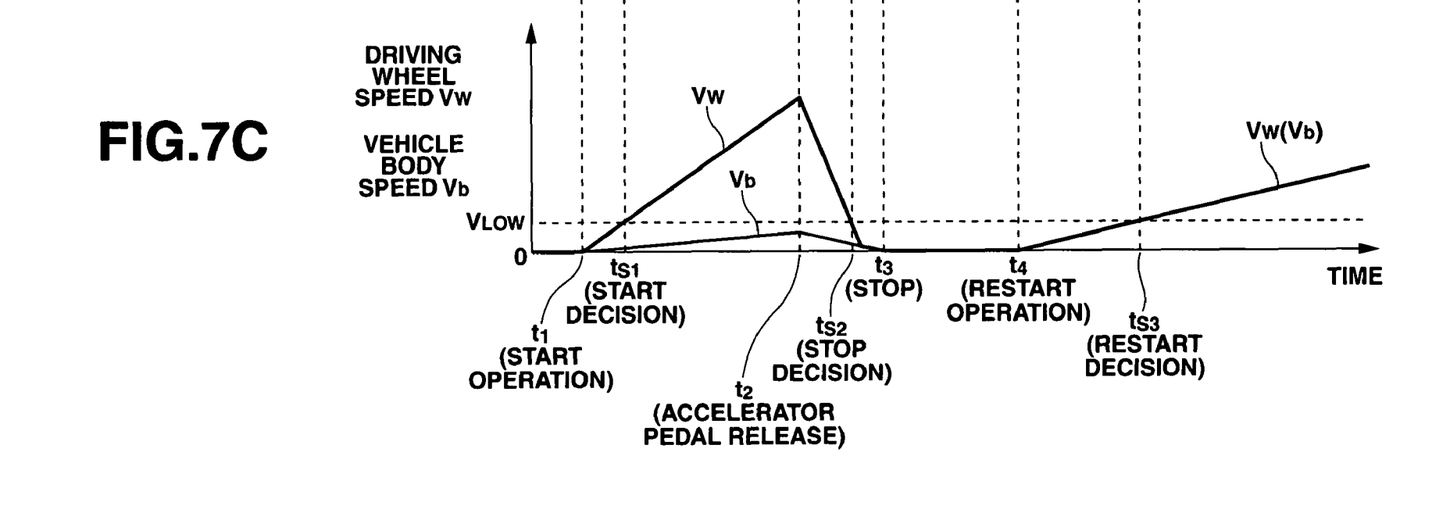

Additionally, although not shown in FIGS. 7A through 7C, if the driving-wheel acceleration α becomes greater than or equal to the spin determination acceleration αspin by the execution of step S100 before the first transmission ratio ip1 is completely recovered to the highest-speed-side transmission ratio by the execution of step S80, the first transmission ratio ip1 is reset to the initial value ip1s taken before the lowering starts. Therefore, even if the driving wheels again generate wheel spin during a process of gradually easing the limitation of the upshift, the function of avoiding a restart disabled state is certainly achieved.

Furthermore, when the vehicle is not equipped with ABS, there is a possibility that the driving wheels are locked due to the abrupt braking operation during a relatively high-speed running on a low-μ road wherein the transmission ratio is set near the highest-speed-side shift line. If the recovery operation of decreasing the depression of the brake pedal is executed with intent to cancel the wheel lock, a state similar to the wheel spin during a vehicle start state is generated. However, under this situation, taking account of a state that the vehicle has run by setting the transmission ratio at the high-speed side, the prohibition of the shift operation of varying the transmission ratio toward the high-speed-side ratio is not executed. This arrangement prevents the transmission ratio to be set at the high-speed-side ratio from being maintained at the low-speed-side ratio. Therefore, it becomes possible to solve a problem that the revolution speed of the input side is raced and thereby applying the large load to the engine and the transmission so that the feeling of controlling the vehicle is degraded.

Although the invention has been described above by reference to a certain embodiment of the invention, the invention is not limited to the embodiments described above. Modifications and variations of the embodiments described above will occur to those skilled in the art, in light of the above teaching.

For example, although the embodiment has been shown and descried such that the wheel spin state of increasing the wheel speed due to the brake release after the wheel lock caused by the braking during the low-μ road high-speed running (excepted object of wheel spin) is determined on the basis of the position psm of the stepping motor 14a at the moment of the determination of the wheel spin state, it may be another method. In this another method, one of the actual transmission ratio ip and the vehicle speed Vsp within a predetermined time t1 is stored, it is determined whether the actual transmission ratio ip has been maintained for at least a predetermined time period t2 within the adjacent time period t1 when it is determined that the vehicle is put in the wheel spin state or whether the vehicle speed Vsp is maintained at a speed higher than a predetermined high sped Vsp1, and it is determined that the excepted object wheel spin is generated when it is determined that the one two determinations in another method is satisfied.

Although the embodiment of the present invention has been explained as to the shift control apparatus of a V-belt type continuously variable transmission, the invention is not limited to this and may be applied to other continuously variable transmission such as a toroidal type continuously variable transmission by using a method of determining the transmission ratio state without a stepping motor.

This application is based on a prior Japanese Patent Application No. 2005-172482. The entire contents of the Japanese Patent Application No. 2005-172482 with a filing date of Jun. 13, 2005 are hereby incorporated by reference. The scope of the invention is defined with reference to the following claims.

What is claimed is:

1. A shift control apparatus of a continuously variable transmission (CVT) which is installed in a vehicle equipped with a brake system except for an antilock brake system, the shift control apparatus comprising:
   a controller arranged
   (a) to obtain a driving-wheel acceleration,
   (b) to estimate a condition of a transmission ratio of the CVT,
   (c) when the driving-wheel acceleration is greater than or equal to a predetermined acceleration that is a spin determination acceleration value for determining wheel spin, to prohibit an upshift operation of varying the transmission ratio to a high speed side transmission ratio relative to a first predetermined transmission ratio, and
   (d) when the transmission ratio is in a high speed side relative to a second predetermined transmission ratio that is a high-speed-side transmission ratio as compared with the first predetermined transmission ratio, under the condition that the driving-wheel acceleration is greater than or equal to the predetermined acceleration, to cancel the prohibition of the upshift operation.

2. The shift control apparatus as claimed in claim 1, wherein the second predetermined transmission ratio is 1.0.

3. The shift control apparatus as claimed in claim 1, wherein the CVT includes a belt-type CVT which comprises a primary pulley, a secondary pulley, a belt wound around the primary and secondary pulleys, and a stepping motor for varying widths of the respective primary and secondary pulleys, the controller being further arranged to estimate the condition of the transmission ratio on a basis of a step position of the stepping motor when the driving-wheel acceleration is greater than or equal to the predetermined acceleration.

4. The shift control apparatus as claimed in claim 1, wherein the predetermined acceleration is a lower limit of an unachievable large acceleration region for the vehicle.

5. The shift control apparatus as claimed in claim 1, wherein the first predetermined transmission ratio is a limit transmission ratio by which the vehicle is capable of starting on a travelable road in friction coefficient and gradient.

6. A method of executing a shift control of a continuously variable transmission (CVT) which is installed in a vehicle equipped with a brake system except for an antilock brake system, the shift control apparatus comprising the steps of:
   obtaining a driving-wheel acceleration;
   estimating a condition of a transmission ratio of the CVT;
   prohibiting an upshift operation of varying the transmission ratio to a high speed side transmission ratio relative to a first predetermined transmission ratio when the driving-wheel acceleration is greater than or equal to a predetermined acceleration that is a spin determination acceleration value for determining wheel spin; and
   canceling the prohibition of the upshift operation when the transmission ratio is in a high speed side relative to a second predetermined transmission ratio that is a high-speed-side transmission ratio as compared with the first predetermined transmission ratio, under the condition that the driving-wheel acceleration becomes greater than or equal to the predetermined acceleration.

7. The method as claimed in claim 6, wherein the second predetermined transmission ratio is 1.0.

8. The method as claimed in claim 6, wherein the CVT includes a belt-type CVT which comprises a primary pulley, a secondary pulley, a belt wound around the primary and secondary pulleys, and a stepping motor for varying widths of the respective primary and secondary pulleys, the controller being further arranged to estimate the transmission ratio on a basis of a step position of the stepping motor when the driving-wheel acceleration is greater than or equal to the predetermined acceleration.

9. The method as claimed in claim 6, wherein the predetermined acceleration is a lower limit of an unachievable large acceleration region for the vehicle.

10. The method as claimed in claim 6, wherein the first transmission ratio is a limit transmission ratio by which the vehicle is capable of starting on a travelable road in friction coefficient and gradient.

11. A shift control apparatus of a continuously variable transmission (CVT) which is installed in a vehicle equipped with a brake system except for an antilock brake system, the shift control apparatus comprising:

driving-wheel acceleration obtaining means for obtaining a driving-wheel acceleration;

transmission ratio estimating means for estimating a condition of a transmission ratio of the CVT;

prohibiting means for prohibiting an upshift operation of varying the transmission ratio to a high speed side transmission ratio relative to a first predetermined transmission ratio, when the driving-wheel acceleration is greater than or equal to a predetermined acceleration that is a spin determination acceleration value for determining wheel spin; and canceling means for canceling the prohibition of the upshift operation when the transmission ratio is in a high speed side relative to a second predetermined transmission ratio that is a high-speed-side transmission ratio as compared with the first predetermined transmission ratio, under the condition that the driving-wheel acceleration is greater than or equal to the predetermined acceleration.

* * * * *